Sept. 7, 1965  O. BUTTER  3,204,744
STEPPING MECHANISM FOR A MEASUREMENT
MARKING AND INSCRIBING MACHINE
Filed Sept. 22, 1964

INVENTOR.
OTTO BUTTER
BY Lowry & Rinehart
ATTYS.

United States Patent Office 3,204,744
Patented Sept. 7, 1965

3,204,744
STEPPING MECHANISM FOR A MEASUREMENT MARKING AND INSCRIBING MACHINE
Otto Butter, Neckargemund, Germany, assignor to G. M. Pfaff A.G., Kaiserslautern, Germany, a firm
Filed Sept. 22, 1964, Ser. No. 398,265
11 Claims. (Cl. 197—2)

This invention relates to a stepping mechanism for a keyboard operated measurement marking and inscribing machine using a plurality of known printing types, which stepping mechanism provides for intermittent and stepwise feed of the whole machine, each feed step corresponding to the type spacing, and is a continuation-in-part of the application filed by me on October 18, 1962, Serial No. 231,448, now abandoned, and embodies improvements in the art thereover.

In a known typewriter provided with a stepping mechanism, the carriage of the typewriter is influenced by a spring which upon depression of each key lever will step the carriage by one tooth spacing of the rack, the remaining part of the typewriter being stationary during carriage travel. If such a stepping mechanism is used in a measurement marking and inscribing machine which contrary to common typewriters is shifted as a unit in a drawing plane mostly inclined relative to the horizontal, difficulties will arise from the use of the spring loaded pull cable termed spring motor in typewriters, since the spring will not be capable of shifting or stepping the entire measurement marking and inscribing machine, especially when typing in ascent. On the other hand, when using a spring of adequate power, the friction between the rack and the parts coacting therewith would be such that reliable stepping of the measurement marking and inscribing machine would be made dubious even when typing in a horizontal plane.

It is the object of the present invention to provide a stepping mechanism for a measurement marking and inscribing machine in which the aforementioned drawbacks are eliminated and which ensures reliable stepping of the machine in any typing direction and with any inclination of the drawing support on which it is used.

This object is attained in a stepping mechanism for a measurement marking and inscribing machine, which comprises a stepping rack, an axle mounted in the frame of the measurement marking and inscribing machine and extending parallel to said stepping rack, a first hinged lever having a stepping pawl and a swinging arm having a locking pawl pivoted on said axle for swinging movement of said stepping pawl and said locking pawl perpendicularly to said stepping rack to alternately cooperate therewith, said locking pawl being normally in engagement with said stepping rack and said first hinged lever being axially displaceable on said axle by at least one tooth spacing of said stepping rack in the longitudinal direction thereof, whereas said swinging arm is locked against axial movement on said axle, and a first cam surface arranged in the path of pivotal movement of said first hinged lever for cooperation therewith in such a manner that when said stepping pawl is in engagement with said stepping rack while said locking pawl is disengaged therefrom, said locking pawl is caused by said cam surface to move in a direction parallel to said stepping rack.

The first hinged lever having the stepping pawl may be provided with a dog engaging the swinging arm having the locking pawl so that when the first hinged lever is actuated it is ensured that the locking pawl is simultaneously disengaged from the stepping rack.

To provide for backspacing of the machine by one type spacing in each instance, a second hinged lever having a resetting pawl may be pivoted on the axle and axially displaceable thereon by at least one tooth spacing of said stepping rack, and a second cam surface may be arranged in the path of pivotal movement of said second hinged lever for cooperation therewith, said second cam surface extending inversely to said first cam surface.

An embodiment of the invention will now be described by way of example and with reference to the accompanying drawings, in which.

Figure 1:
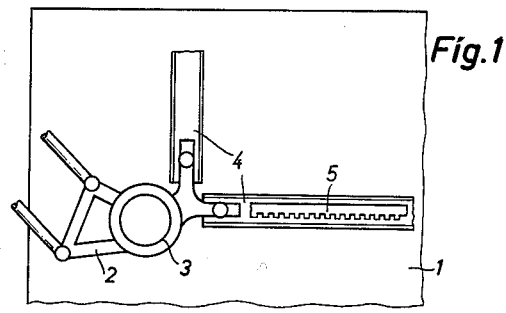
FIG. 1 is a top plan view of a drawing machine incorporating a stepping rack of a stepping mechanism according to the present invention.

FIG. 1 shows a drawing board 1 on which is mounted a drawing machine comprising a parallelogram guide 2 mounting an adjustable protractor head 3 carrying two drawing rulers 4. One of the drawing rulers 4 mounts a stepping rack 5 of the stepping mechanism proposed by the present invention. The stepping rack 5 is adapted to carry a measurement marking and inscribing machine and to serve as a slide guide for same.

Figure 3:
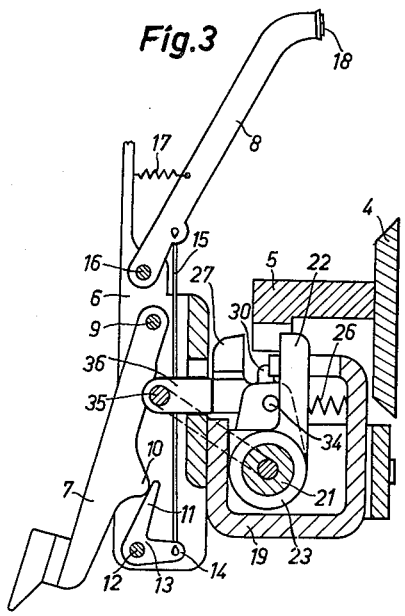
FIG. 3 is a section taken on line III—III of FIG. 2.

Referring to FIG. 3, such measurement marking and inscribing machine has a segment 6 in which key levers 7 and type bars 8 are pivoted. Each key lever 7 is mounted on an axle 9 and provided with an integral cam 10 for cooperation with a first lever arm 11 of a double-armed lever 13 mounted on an axle 12. One end of a connecting rod 15 is hinged to a second lever arm 14 of the double-armed lever 13, whereas the other end of the connecting rod 15 is hinged to the type bar 8, which is mounted on an axle 16, so that when the key on the key lever 7 is struck the type bar 8 will be moved toward the drawing paper 1 to print thereon a letter or symbol corresponding to a type 18 provided at the free end of the type bar 8. Such movement of the type bar 8 takes place against the action of a recuperating spring 17 secured with one end to the type bar 8 and with the other end to the segment 6.

Figure 4:
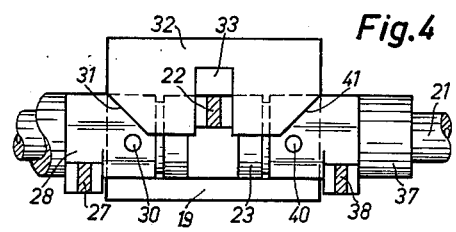
FIG. 4 is a section taken on line IV—IV of FIG. 2.
Figure 2:
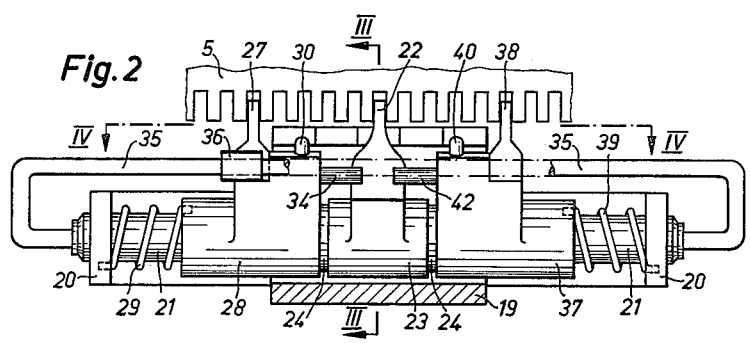
FIG. 2 is a top plan view of the stepping mechanism with the key levers and type bars having been omitted.
Figure 5:
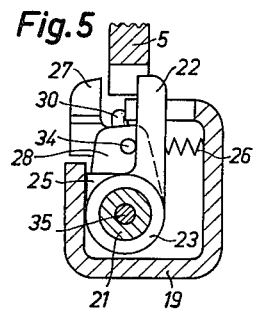
FIG. 5 is a section taken substantially on line III—III of FIG. 2 and showing the mechanism in the initial stepping phase.
Figure 6:
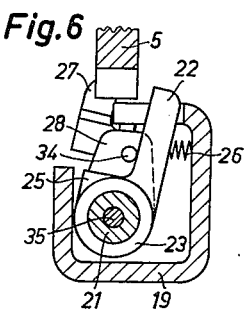
FIG. 6 is a similar view showing the mechanism in an intermediate stepping phase.
Figure 7:
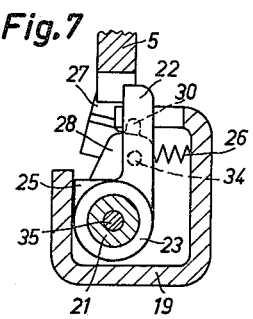
FIG. 7 is a similar view showing the mechanism in the final stepping phase.

Rigidly connected with the segment 6 of the measurement marking and inscribing machine is a bearing bracket 19 accommodating the stepping mechanism proper and having two end plates 20, FIG. 2, mounting the ends of an axle 21 which is provided with an axial central bore. A swinging arm 23 provided with a locking pawl 22 is freely rotatable on the axle 21 and secured against axial movement thereon by means of two locking rings 24 (FIG. 2). The swinging arm 23, moreover, is provided with a limit stop 25 (FIGS. 5, 6 and 7) normally urged against the wall of the bearing bracket 19 by means of a spring 26 which bears with one end thereof against a wall of the bearing bracket 19 and with the other against the swinging arm 23 itself so that the locking pawl 22 is kept engaged in the stepping rack 5. Referring now especially to FIG. 2, a first hinged lever 28 provided with a stepping pawl 27 is freely pivotable about the axle 21 on which it is arranged in axially spaced relationship to one side of the swinging arm 23 and so as to be axially shiftable by at least one tooth spacing of the stepping rack 5. Normally, the hinged lever 28 is urged against the respective locking ring 24 by means of a spring 29. In this normal position of the hinged lever 28, the stepping pawl 27 is disengaged from the stepping rack 5, as can be seen from FIGS. 3 and 5. The hinged lever 28 carries a guide pin 30 for cooperation with a first cam surface 31 of a cam plate 32 (FIG. 4) secured to the bearing bracket 19 and thus rigidly connected with the segment 6 of the measurement marking and inscribing machine. The portion of the cam plate 32 which projects into the path of movement of the locking pawl 22 is provided with a recess 33 so that the locking pawl 22 can move without hindrance into engagement with the stepping rack 5. On its end face adjacent the swinging arm 23, the hinged lever 28 also mounts a dog 34 which engages the upper side of the swinging arm 23 provided with the locking pawl 22. The length of the dog 34 is accurately determined for a purpose to be explained hereinafter.

The axial bore in the axle 21 accommodates a universal rail 35 which extends over the whole width of the segment 6 for cooperation with the key levers 7. When any one of the key levers 7 is struck, the universal rail 35 is moved downwardly while its upper end in FIG. 3 is simultaneously rotated in clockwise direction.

As shown in FIG. 2 in which part of the universal rail 35 is shown broken away for the sake of clearness, the broken away portion being indicated by dot and dash lines, a thumb 36 is mounted on the universal rail 35 above the hinged lever 28 so as to engage same, thereby to ensure that when the universal rail 35 is moved downwardly with respect to FIG. 2, the hinged lever 28 is also moved downwardly through the intermediary of the thumb 36.

Still with reference to FIG. 2, to enable the measurement marking and inscribing machine to be stepped in inverse direction with respect to the normal typing direction, a second hinged lever 37, which is provided with a resetting pawl 38, is pivoted on the axle 21 on the side of the swinging arm 23 opposite to where the first hinged lever 28 is arranged on the same axle 21 so that the swinging arm 23 is located between the first hinged lever 28 and the second hinged lever 37, with the interposition of the two locking rings 24. In its normal position, the hinged lever 37 is disengaged from the stepping rack 5. Analogous to the first hinged lever 28, also the second hinged lever 37 is axially displaceable on the axle 21 by at least one tooth spacing of the stepping rack 5 and held in its normal position, in which it is urged against the respective locking ring 24, by means of a spring 39 secured, on the one hand, to the outward end face of the second hinged lever 37 and, on the other hand, to the respective end plate 20. Laterally spaced from the resetting pawl 38, a guide pin 40 which extends parallel to the resetting pawl 38 is provided on the hinged lever 37 for cooperation with a second cam surface 41 of the cam plate 32, FIG. 4, which second cam surface 41 extends inversely to the first cam surface 31. The end face of the hinged lever 37 which faces the swinging arm 23 carries a dog 42 extending parallel to the axle 21 and engaging the upper side of the swinging arm 23 in the same manner as the dog 34 carried by the first hinged lever 28. For a purpose to be explained hereinafter, also the dog 42 is of exactly determined length. A back spacer key, not shown, is pivoted in a known manner in the segment 6 above the hinged lever 37 and when this back spacer key is struck, the hinged lever 37 and thus also the resetting pawl 38 provided thereon are moved downwardly toward the stepping rack 5.

The mode of operation of the stepping mechanism proposed by the present invention is as follows:

Be it assumed that the measurement marking and inscribing machine supported on the drawing ruler 4 is in the initial position in which the printing point of the types is substantially in the place corresponding with the letter or symbol first to be typed. Now when one of the key levers 7 is struck the universal rail 35 is moved downwardly and in clockwise direction. At the same time, the thumb 36 mounted on the universal rail 35 forces the first hinged lever 28 and thus the stepping pawl 27 downwardly toward the stepping rack 5, i.e. in clockwise direction with respect to FIGS. 3 and 5. During this movement of the first hinged lever 28, the dog 34 engaging the swinging arm 23 carries along same, thereby forcing the locking pawl 22 against the action of the spring 26 away from the stepping rack 5 so that the locking pawl 22 is disengaged from the stepping rack 5 while the stepping pawl 27 is brought into engagement therewith. With the movement of the key lever 27 continuing, also the clockwise rotation, with respect to FIG. 3, of the first hinged lever 28 is continued and thus the locking pawl 22 is moved a certain distance away from the stepping rack 5 (see FIG. 6). During this movement, the guide pin 30 carried by the first hinged lever 28 engages the first cam surface 31 of the cam plate 32. Since at this moment the stepping pawl 27 is in engagement with the stepping rack 5, which is stationary during the typing operation, whereas the locking pawl 22 is disengaged therefrom, the stepping pawl 27 can only move radially when the movement of the key lever 7 continues so that in consequence of the sliding engagement of the pin 30 with the first cam surface 31 the entire measurement marking and inscribing machine, except the first hinged lever 28, is shifted toward the right in FIG. 2. Due to its accurately determined length, the dog 34 slides off the swinging arm 23 during this shifting so that the swinging arm 23 is released and moved toward the stepping rack 5 by the partly relaxing spring 26, the locking pawl 22 at the same time engaging the underside of a tooth of the stepping rack 5. In the further course of movement of the key lever 7, the entire measurement marking and inscribing machine is shifted toward the right in FIG. 2 until the locking pawl 22 is below the next tooth gap and engaged therein by the further relaxing spring 26. Since the tooth spacing of the stepping rack 5 corresponds with the type spacing, the measurement marking and inscribing machine has thus been stepped by exactly one type spacing. At the same time, the first hinged lever 28 is axially shifted away from the respective locking ring 24 by a distance corresponding to the type spacing and thus the spring 29 is axially tightened.

During the aforedescribed movement of the key lever 7, the cam 10 thereof has pivoted the angle lever 13 about its axle 12 so that the connecting rod 15 was pulled downwardly (FIG. 3) whereby the type bar 8 was turned about its axle 16 and at the same time moved toward the drawing paper fixed on the drawing board 1. In the further movement of the key lever 7, the type 18 at the free end of the type bar 8 will reach the drawing paper and print a letter or symbol thereon.

When the key lever 7 is subsequently released, the type bar 8 is returned into its initial position by the relaxing recuperating spring 17. At the same time, also the spring 29 is released, which upon depression of the key lever 7 is subjected to torsion as well as compression, whereby the first hinged lever 28 and thus the stepping pawl 27 first move contrary to their original direction of movement, thereby to take both the universal rail 35 and the key lever 7 back into their initial positions, with the stepping pawl 27 at the same time disengaging from the stepping rack 5. The spring 29 now can relax also in axial direction and, consequently, shifts the first hinged lever 28 on the axle 21 until this has reached its normal position in which the hinged lever 28 is urged against the respective locking ring 24. The key lever 7 and the type bar 8 as well as the universal rail 35 now reassume their initial positions, with the locking pawl 22 being engaged in the tooth gap of the stepping rack 5 which is next to its starting position, in typing direction.

To step the measurement marking and inscribing machine contrary to the normal typing direction, the back spacer key, which is not shown in the drawings, has to be operated. The back spacer key is arranged to act directly on the second hinged lever 37 carrying the resetting pawl 38, which thereby is pivoted toward the stepping rack 5 against the action of the spring 39. In this movement, the swinging arm 23 is carried along by the dog 42 of the second hinged lever 37 so that the locking pawl 22 is moved away from the stepping rack 5. The locking pawl 22 thus is disengaged from the stepping rack 5, whereas the resetting pawl 38 is brought into engagement therewith. In the further movement of the back spacer key, the guide pin 40 slidably engages the cam surface 41 of the cam plate 32 so that owing to the fact that the resetting pawl 38 is in engagement with the stepping rack 5, which is stationary during the typing operation, the cam plate 32 and thus the entire measurement marking and inscribing machine, except the second hinged lever 37 and the resetting pawl 38 connected therewith, is moved toward the left in FIG. 2 in correspondence with the pitch of the cam surface 41. During this movement, the dog 42 slides off the swinging arm 23 which thus is released so that the locking pawl 22 engages the underside of a tooth of the stepping rack 5 through the action of the now partly relaxing spring 26. In the further movement of the back spacer key, the guide pin 40 slides along the cam surface 41 moving toward the left in FIG. 2, and thus moves the machine toward the left until the locking pawl 22 is exactly below the next tooth gap to engage therein by the action of the further relaxing spring 26.

When the back spacer key is released after the locking pawl 22 is in engagement with the stepping rack 5, the spring 39, which is subjected to torsion as well as compression, is released so that the hinged lever 37 will move with its resetting pawl 38 contrary to its original direction of movement, thereby to return the back spacer key into its initial position. Since the resetting pawl 38 is disengaged from the stepping rack 5 in the course of this rotating movement, the spring 39 now can relax also in axial direction, whereby the hinged lever 37 is shifted on the axle 21 toward the left in FIG. 2 until it abuts again on the respective locking ring 24.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalencey of the claims are therefore intended to be embraced therein.

I claim:

1. A stepping mechanism for a marking machine comprising a frame, a stepping rack carried by said frame, said stepping rack including spaced tooth-like projections, an axle carried by said frame in parallel relationship to said stepping rack, a first hinged lever having a stepping pawl mounted on said axle for movement into and out of registration between said tooth-like projections, a swinging arm having a locking pawl mounted on said axle for movement into and out of registration between said tooth-like projections, a cam carried by said frame, said cam being in alignment with said first hinged lever, said first hinged lever being normally out of registration with said rack, said locking pawl being normally in registration with said rack, means biasing said first hinged lever against axial movement in a first direction relative to said frame, means for moving said locking pawl out of its normal registration with said rack, means carried by said first hinged lever and cooperative with said cam for shifting said first hinged lever axially against said biasing means upon the movement of said locking pawl by said moving means, and means limiting the axial movement of said first hinge lever in a second direction opposite said first direction a distance between adjacent one of said spaces.

2. The stepping mechanism as defined in claim 1 wherein said means carried by said first hinged lever is a pin aligned for contact with said cam upon the movement of said first hinged lever toward said cam.

3. The stepping mechanism as defined in claim 1 wherein said limiting means is a dog carried by said first hinge lever, said dog normally contacting said swinging arm when said swinging arm is in registration with said rack and being disengageable with said swinging arm upon a predetermined movement of said first hinge lever in said second direction upon the shifting movement of said first hinged lever by said cam.

4. The stepping mechanism as defined in claim 1 wherein said means carried by said first hinge lever is a pin aligned for contact with said cam upon the movement of said first hinge lever toward said cam, said limiting means being a dog carried by said first hinge lever, said dog normally contacting said swinging arm when said swinging arm is in registration with said rack and being disengageable with said swinging arm upon a predetermined movement of said first hinge lever in said second direction upon the shifting movement of said first hinge lever by said cam.

5. A stepping mechanism for a marking machine comprising a frame, a stepping rack carried by said frame, said stepping rack including alternating spaces and projections, a first hinge lever, means mounting said first hinge lever for pivotal movement from a first position out of registration with said stepping rack to a second position in registration with said stepping rack, a first swinging arm, means mounting said swinging arm for pivotal movement from a first position in registration with said stepping rack to a second position out of registration with said stepping rack, said first hinge lever being in the first and second positions thereof when said swinging arm is in the respective second and first position thereof, means normally biasing said first hinge lever and said swinging arm toward each other in a first direction generally normal to the plane of pivotal movement of at least one of said first hinge levers and said swinging arm, means for pivotally moving said first hinge lever and said swinging arm between the respective first and second positions thereof, first cam means for shifting said first hinge lever in a second direction opposite to said first direction upon the movement of said first hinge lever from the first position to the second position thereof, means for limiting the shifting movement of said first hinge lever in said second direction a distance between adjacent ones of said spaces, and means for returning said swinging arm from said second position to said first position.

6. The stepping mechanism as defined in claim 5 including a second hinge lever, means mounting said second hinge lever for pivotal movement from a first position out of registration with said stepping rack to a second position in registration with said stepping rack, a second swinging arm, means mounting said second swinging arm for pivotal movement from a first position in registration with said stepping rack to a second position out of registration with said stepping rack, said second hinge lever being in the first and second positions thereof when said second swinging arm is in the respective second and first positions thereof, means normally biasing said second hinge lever and said swinging arm toward each other in a direction opposite to said first direction and generally normal to the plane of pivotal movement of at least one of said second hinge levers and said second swinging arm, means for pivotally moving said second hinge lever and said second swinging arm between the respective first and second positions thereof, second cam means for shifting said second hinge lever in said first direction upon the movement of said second hinge lever from the first position to the second position thereof, means for limiting the shifting movement of said second hinge lever in said first direction a distance between adjacent ones of said spaces, and means for returning said second swinging arm from said second position to said first position.

7. The stepping mechanism as defined in claim 5 wherein said cam means is carried by said frame and includes a cam surface alignable for contact with a pin carried by said first hinge lever during the movement thereof from the first position to the second position thereof.

8. The stepping mechanism as defined in claim 5 wherein said limiting means is a dog carried by said first hinge lever, said dog having an end portion normally contacting said swinging arm when said swinging arm is in registration with said rack and being disengageable with said swinging arm upon the shifting of said first hinge lever in said second direction, and the length of said end portion contacting said swinging arm corresponding to the distance between adjacent ones of said spaces.

9. The stepping mechanism as defined in claim 5 wherein said biasing means is a torsion spring.

10. The stepping mechanism as defined in claim 5 wherein said cam means is carried by said frame and includes a cam surface alignable for contact with a pin carried by said first hinge lever during the movement thereof from the first position to the second position thereof, wherein said limiting means is a dog carried by said first hinge lever, said dog having an end portion normally contacting said swinging arm when said swinging arm is in registration with said rack and being disengageable with said swinging arm upon the shifting of said first hinge lever in said second direction, and the length of said end portion contacting said swinging arm corresponding to the distance between adjacent ones of said spaces.

11. An escape mechanism comprising an elongated rack having a plurality of equally spaced and alternating projections and spaces, first and second arms, means mounting said first and second arms for pivotal movement in parallel planes normal to the longitudinal axis of said elongated rack, said first arm being normally positioned between adjacent ones of said projections and said second arm being normally positioned in alignment with but out of registration with an associated one of said spaces, means coupling said first and second arms for simultaneous movement between a first position in which said first and second arms are respectively in and out of registration with said rack and a second position in which said first and second arms are respectively out of and in registration with said rack, cam means alignable for contact by a portion of said second arm during the movement from unregistered to registered position thereof for moving said second arm in a first direction away from said first arm and normal to the pivotal plane of said arms, biasing means urging said second arm toward said first arm in a second direction opposite to said first direction, a dog carried by said second arm, said dog having an end portion contactingly overlying said first arm in the first position thereof, and the length of the end portion of the dog contacting the first arm being substantially equal to the length of any one of said projections in the direction of the rack axis.

References Cited by the Examiner

UNITED STATES PATENTS

| | | | |
|---|---|---|---|
| 752,793 | 2/04 | Moya | 197—89 |
| 1,033,481 | 7/12 | Shepard | 197—88 |
| 1,414,310 | 4/22 | Smith | 197—82 |
| 1,429,066 | 9/22 | Diss | 197—82 |
| 3,095,075 | 6/63 | Butter | 197—2 |

ROBERT E. PULFREY, *Primary Examiner.*